Dec. 25, 1962 C. E. BARKALOW 3,070,192
TEMPERATURE COMPENSATED VISCOUS DAMPER
Filed May 13, 1958 2 Sheets-Sheet 1

INVENTOR.
CLARE E. BARKALOW
BY

Dec. 25, 1962 C. E. BARKALOW 3,070,192
TEMPERATURE COMPENSATED VISCOUS DAMPER
Filed May 13, 1958 2 Sheets-Sheet 2

INVENTOR.
CLARE E. BARKALOW
BY

3,070,192
TEMPERATURE COMPENSATED VISCOUS DAMPER

Clare E. Barkalow, Comstock Park, Mich., assignor to Lear, Incorporated
Filed May 13, 1958, Ser. No. 735,056
7 Claims. (Cl. 188—90)

The present invention relates to a rotary viscous damper and, more particularly, to a shear-type viscous damper for rotating devices.

In most rotary viscous devices there exists the problem of maintaining a constant damping throughout different temperature ranges. As is well known in the art, the damping effect of viscous fluid changes as temperature changes and also as the distance between the rotating member and stationary member changes. A temperature variance changing the damping effect of viscous fluid requires controlling the distance between the rotating member and the stationary member in order to maintain a constant damping.

In the past, the innermost member has been constructed of a material having a high coefficient of expansion and the outermost member or housing surrounding the innermost member has been constructed of a material having a low coefficient of expansion. Although a temperature change causes the gap between the rotating member and the housing to change due to the differential expansion of the members, the change of the gap distance is slight compared to the viscosity change of the fluid. As a result, the compensating effect does not equal the damping change of the viscous fluid.

Therefore, it is an object of this invention to provide a device wherein a uniform damping effect is obtained.

Another object of this invention is to provide a device wherein a constant damping torque may be exerted on a rotating body irrespective of temperature changes that may affect the viscosity of the damping fluid.

Other objects and their advantages will become apparent from the following description taken in conjunction with the drawings in which.

Figure 1:
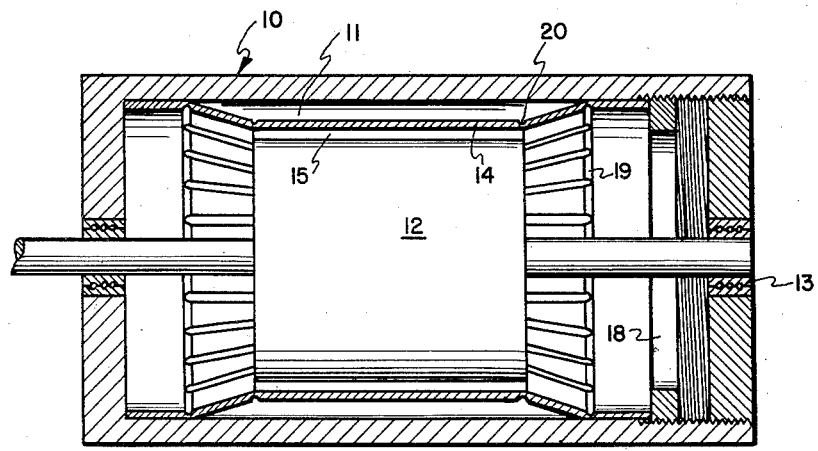
FIG. 1 is a cross section of the first embodiment of the present invention.
Figure 2:
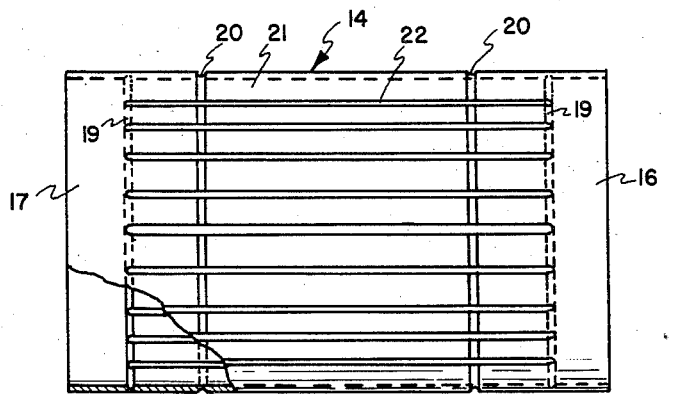
FIG. 2 is a partial section of the distortable slotted cylinder.

Referring now to FIGS. 1 and 2, the housing 10, made of a material having a low coefficient of expansion, forms a cylindrical cavity 11 containing a viscous fluid (not shown) in which is mounted a rotating member 12, such as a rate gyro or accelerometer supported by bearings 13. A distortable slotted cylinder 14, constructed of a material having a high coefficient of expansion, surrounds the peripheral edge of the rotating member 12 and forms a gap 15 between the distortable member 14 and the rotating member 12 and has its end portions 16 and 17 attached to or confined by the housing 10 and an adjusting ring 18 which is threaded to fit into housing 1 to adjust the distortion of the distortable member 14 prior to attaching the distortable member 14 to the housing 10.

The distortable cylinder 14 has cylindrical grooves 19 on the inside surface thereof and circumferential grooves 20 on the outside diameter. The circumferential grooves 19 and 20 divide the cylinder into the two end portions 16 and 17 and a center portion 21. Longitudinal slots 22 are cut through the wall of the cylinder between the grooves 19. The grooves 19 and 20 and the slots 22 allow the walls of the distortable cylinder 14 to be bent inward. With the end portions 16 and 17 of distortable cylinder 14 being attached to the housing 10, an expansion of the distortable member 14 due to a temperature rise causes the distortable member 14 to bow in making the gap 15 smaller and increasing the damping effect of the viscous fluid. Likewise, a contraction of the distortable cylinder 14 caused by a lowering of the temperature causes the gap 15 to be increased and decreases the damping effect of the viscous fluid.

In operation, the gap 15 between the peripheral edge of rotating member 12 and the inside diameter of the distortable cylinder 14 is initially set with the adjusting ring 18 to provide a given damping effect from a given viscous fluid. The ends 16 and 17 of the distortable member 14 are then fixed to the inside surface of housing 10, e.g., with spot welds. However, a temperature change can cause the viscous fluid to vary its damping effect. Therefore, it is desirable to change the gap 15 to compensate for the variation in damping of the fluid. Hence, when the temperature of the fluid rises and its viscosity decreases causing the damping effect to decrease, the distortable cylinder 14, being of a material having a high coefficient of expansion, expands and being confined by housing 10 which has a low coefficient of expansion, is forced to bow in toward the rotating member 12 and reduces the size of the gap 15 causing the damping effect of the viscous fluid to be increased. Likewise, when the temperature of the viscous fluid is reduced, its damping effect increases and the distortable member 14 contracts, pulling away from the rotating member 12 causing the gap 15 to become larger which reduces the damping effect of the fluid.

It can be seen then that as the viscosity of the viscous fluid changes due to temperature changes, the gap 15 changes accordingly to compensate for the damping changes because of the contraction and expansion of distortable member 14. The housing 10, in effect, amplifies the movement of the distortable member 14 because of the difference in the coefficient of expansion of the housing and the distortable member.

Figure 5:
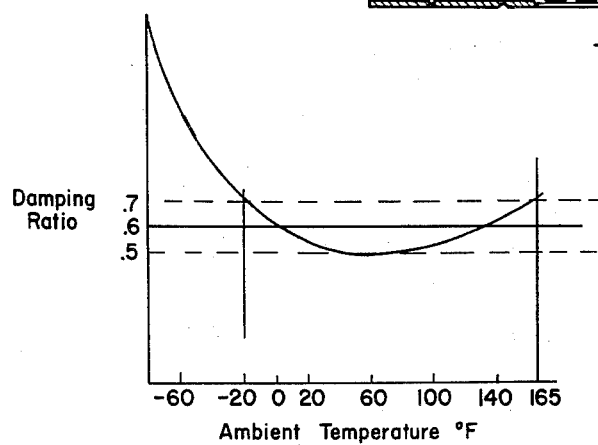
FIG. 5 is a graph, ambient temperature vs. damping ratio.

Consider, e.g., that a gap of .0035 inch in a particular configuration, such as in FIGS. 1 and 2, wherein the rotating member is a miniature rate gyro, can be made to yield a damping ratio of .6 in a given fluid at room temperature (77° F.). The graph in FIG. 5 shows that in using a damping device as shown in FIGS. 1 and 2, the damping ratio does not vary more than plus or minus one-tenth over a temperature range from approximately −20° F. to approximately 165° F. This provides a wide range of temperatures over which a rotating member such as a miniature rate gyro can operate without outside compensation for changes in damping ratio of the viscous fluid due to temperature changes of the fluid. It is to be noted that there will be a temperature rise of approximately 35° F. inside the housing as compared with the air on the outside of the housing due to the heat generated by the gyro motor and the graph is charted for outside temperatures.

If desired, the distortable member may be carried on the rotating member and bowed outward to cause damping between the distortable member and the housing.

Figure 3:
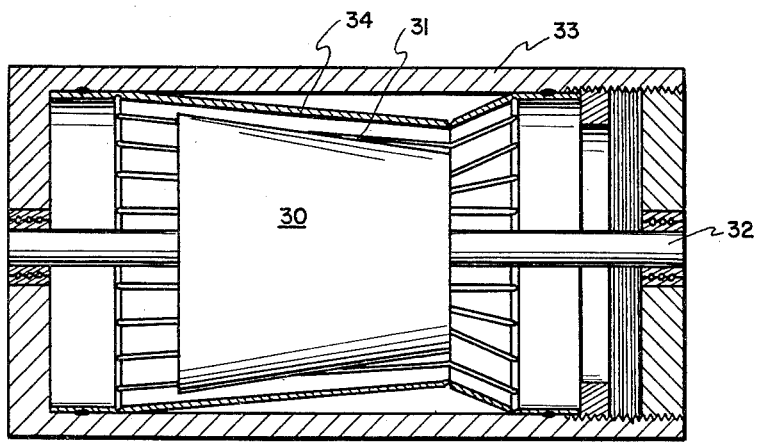
FIG. 3 is a sectional view of the second embodiment of the present invention.

FIG. 3 shows a second embodiment wherein the innermost or rotatable member 30 has a peripheral edge 31 which is cone shaped and is mounted on a shaft 32 and supported by a housing 33. Mounted on the inside of housing 33 is a distortable member 34 similar to the distortable member 14 shown in FIGS. 1 and 2, except that the distortable member 34 has only one cylindrical groove on the outside diameter thereof. The distortable member 34 is fixed to the housing 33 in the same manner as the distortable member 14 in FIGS. 1 and 2 and a viscous fluid is contained within the housing 33. It can be seen that as the distortable member 34 expands due to temperature rise of the viscous fluid, and because it has only one cylindrical groove on the outside diameter thereof, it assumes a triangular shape causing the inside diameter of distortable member 34 to form a smaller cone and the average gap distance between the peripheral edge of the rotatable member 30 and the distortable member 34 to be decreased thereby increasing the damping effect of the fluid within the housing 33. Likewise, a temperature drop causes the average gap distance to be increased.

Figure 4:
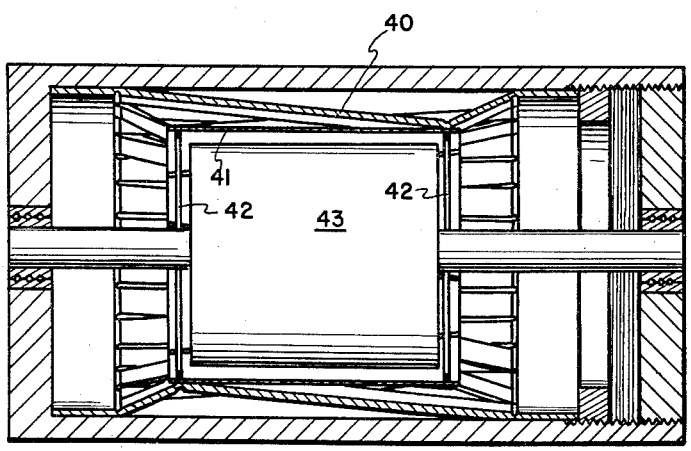
FIG. 4 is a sectional view of still another embodiment of the invention.
Figure 6:
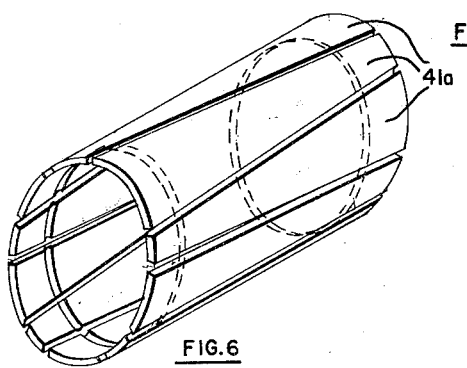
FIG. 6 is a perspective view of the distortable cylinder shown in FIG. 4.

FIG. 4 shows still another embodiment wherein the distortable member 40 is similar to the distortable members 14 and 34 as described in FIGS. 1, 2 and 3, except that each section between the longitudinal slots has a groove on the outside diameter thereof near alternately opposite ends. Hence, when a temperature rise causes the distortable member 40 to expand or lengthen, each section expands, its shape defines a triangle and each alternate section has its apex point at the same end. The innermost edges or apex points of the distortable member come in contact with still another cylinder 41, shown in FIG. 6, which is formed of trapezoidal sections 41a, wider at one end than the other, and urged outward by expansion rings 42. The rotatable member is located within the inside diameter of the cylinder 41. Each trapezoidal section of cylinder 41 is keyed to only one apex point of the distortable member 40, even though three apex points of member 40 come in contact with each trapezoidal section, two apex points touching the wide end of each trapezoidal section and one apex point touching the narrow end of each trapezoidal section. As the distortable member 40 contracts and expands, the gap distance between the inside diameter of the cylinder 41 and the rotatable member 43 is changed due to the change of pressure exerted on the cylinder 41 by the apex points of the distortable member 40.

In all embodiments of this invention, of course, the heretofore referred to rotating member may be held stationary and the stationary member may be rotated.

It can be seen that I have provided a simple temperature compensated viscous damper in which a constant damping is applied to a rotatable or rotating member regardless of temperature changes within the unit. The damper requires very little space, is simple to construct and is easily adjusted with a threaded ring to give the optimum damping ratio.

Although the present invention has been described with a certain degree of particularity, it is understood that various modifications in the details and arrangements of parts may be had without departing from the spirit and scope of the invention as hereinafter claimed.

I claim:

1. A damping device comprising a housing constructed of a material having a low coefficient of expansion forming a cylindrical cavity, a viscous fluid in said cavity, a rotatable member within and supported by said housing, a cylindrical distortable member with a high coefficient of expansion within said cavity having a plurality of circumferential narrow grooves intermediate its ends and having its axial extremities held in a fixed position by said housing, wherein said circumferential narrow grooves provide substantially localized yield lines and wherein the sum of the widths of said plurality of circumferential narrow grooves constitutes a minor portion of the end-to-end distance of said cylindrical distortable member whereby the major contribution to damping is provided by substantially straight portions of said cylindrical distortable member intermediate said narrow grooves, said distortable member inclosing the peripheral surface of said rotatable member thereby forming a gap between the peripheral surface of said rotatable member and inside diameter of said distortable member, said distortable member being distorted radially in response to temperature change, said distortable member being distorted in an inward direction with increase in temperature, thereby making said gap distance a function of temperature.

2. A damping device comprising a housing constructed of a material having a low coefficient of expansion forming a cylindrical cavity, a viscous fluid in said cavity, a first cylindrical distortable member with a high coefficient of expansion within said cavity having its axial extremities held in a fixed position by said housing, said first cylindrical distortable member having a plurality of circumferential narrow grooves intermediate its ends wherein said circumferential narrow grooves provide substantially localized yield lines and wherein the sum of the widths of said plurality of circumferential narrow grooves constitutes a minor portion of the end-to-end distance of said cylindrical distortable member whereby the major contribution to damping is provided by substantially straight portions of said cylindrical distortable member intermediate said narrow grooves, a second cylindrical distortable member positioned within the inside diameter of said first distortable member, said second distortable member having means therein for urging said second distortable member in an outward direction and against said first cylindrical distortable member, a rotatable member within said second distortable member and supported by said housing, said first distortable member being distorted radially in response to temperature change, said first distortable member being distorted in an inward direction with increase in temperature, thereby varying the volume inclosed by said second distortable member and causing the gap distance between the inside diameter of said second distortable member and the outside diameter of said rotatable member to change accordingly.

3. A damping device comprising a housing constructed of a material having a low coefficient of expansion forming a cylindrical cavity, a viscous fluid within said cavity, a rotatable member mounted in said cavity and supported by said housing, means to rotate said rotatable member, a cylindrical distortable member made of a material having a high coefficient of expansion and having slots parallel to the axis of said distortable member and intermediate its ends mounted within said cavity such that said distortable member encompasses the peripheral surface of said rotatable member, said distortable member having a plurality of circumferential narrow grooves intermediate its ends and wherein said circumferential narrow grooves provide substantially localized yield lines and wherein the sum of the widths of said plurality of circumferential narrow grooves constitutes a minor portion of the end-to-end distance of said cylindrical distortable member whereby the major contribution to damping is provided by substantially straight portions of said cylindrical distortable member intermediate said narrow grooves, said cylindrical distortable member having its axial extremities held in a fixed position by said housing such that a radial distortion of said distortable member due to temperature change causes said distortable member to change the gap distances between the inside diameter of said distortable member and peripheral surface of said rotatable member, said distortable member being distorted in an inward direction with increase in temperature.

4. A damping device comprising a housing constructed of a material having a low coefficient of expansion forming a cylindrical cavity, a viscous fluid within said cavity, a rotatable member mounted on a shaft in said cavity, said shaft being supported by said housing, means to rotate said rotatable member, a cylindrical distortable member being of a material having a high coefficient of expansion mounted within said cavity such that said distortable member encompasses the peripheral surface of said rotatable member, said distortable member having near each end a circumferential narrow groove on the inside and a circumferential narrow groove on the outside surfaces and longitudinal slots through the wall of said distortable member running from the grooves at one end of said distortable member to the grooves at the other end of said distortable member, wherein said circumferential narrow grooves provide substantially localized yield lines and wherein the sum of the widths of said plurality of circumferential narrow grooves constitutes a minor portion of the end-to-end distance of said cylindrical distortable member whereby the major contribution to damping is provided by substantially straight portions of said cylindrical distortable member intermediate said narrow grooves, said distortable member being confined at its extremities to the inside of said housing such that radial distortion of said distortable member as a result of temperature change causes said distortable member to change the gap distance between it and the peripheral surface of said rotatable member, and an adjusting ring being threaded to associate with threads on the inside of said housing, said adjusting ring being adjacent to one end of said distortable member such that movement of said adjusting ring causes distortion of said distortable member.

5. A damping device comprising a housing constructed of a material having a low coefficient of expansion forming a cylindrical cavity, a viscous fluid within said cavity, a cone shaped rotatable member mounted on a shaft in said cavity, said shaft being supported by said housing, means to rotate said rotatable member, a cylindrical distortable member made of a material having a high coefficient of expansion mounted within said cavity such that said distortable member encompasses the peripheral surface of said rotatable member, said distortable member having near each end a circumferential narrow groove on the inside surface thereof and one circumferential narrow groove on the outside surface thereof located between said cylindrical grooves on said inside surface, and wherein said circumferential narrow grooves provide substantially localized yield lines and wherein the sum of the widths of said plurality of circumferential narrow grooves constitutes a minor portion of the end-to-end distance of said cylindrical distortable member whereby the major contribution to damping is provided by substantially straight portions of said cylindrical distortable member intermediate said narrow grooves, and longitudinal slots through the wall of said distortable member extending from the inside groove at one end of said distortable member to the inside groove at the other end of said distortable member, said distortable member having its axial extremities held in a fixed position by said housing such that a radial distortion of said distortable member as a result of temperature change causes said distortable member to change the gap distance between it and the peripheral surface of said rotatable member, said distortable member being distorted in an inward direction with increase in temperature, and an adjusting ring being threaded to associate with threads on the inside of said housing, said adjusting ring being adjacent to one end of said distortable member such that movement of said adjusting ring causes distortion of said distortable member.

6. A damping device comprising a housing constructed of a material having a low coefficient of expansion forming a cylindrical cavity, a viscous fluid within said cavity, a rotatable member mounted on a shaft, said shaft being supported by and extending through the wall of said housing and providing means to rotate said rotatable member, a cylindrical distortable member being of a material having a high coefficient of expansion mounted within said cavity such that said distortable member encompasses the peripheral surface of said rotatable member, said distortable member having near each end a circumferential narrow groove on the inside and outside surfaces and longitudinal slots through the wall of said distortable member running from the grooves at one end of said distortable member to the grooves at the other end of said distortable member, wherein said circumferential narrow grooves provide substantially localized yield lines and wherein the sum of the widths of said plurality of circumferential narrow grooves constitutes a minor portion of the end-to-end distance of said cylindrical distortable member whereby the major contribution to damping is provided by substantially straight portions of said cylindrical distortable member intermediate said narrow grooves, said distortable member being attached at its extremities to the inside of said housing such that radial distortion of said distortable member as a result of temperature change causes said distortable member to change the gap distance between it and the peripheral surface of said rotatable member, and an adjusting ring being threaded to associate with threads on the inside of said housing, said adjusting ring being adjacent to one end of said distortable member such that movement of said adjusting ring causes distortion of said distortable member for initially setting said gap distance prior to attaching the ends of said distortable member to said housing.

7. A damping device comprising a housing constructed of a material having a low coefficient of expansion forming a cylindrical cavity wherein said cavity contains a viscous fluid, a first cylindrical distortable member with a high coefficient of expansion within said cavity having its axial extremities held in a fixed position by said housing, said first distortable member having near each end a circumferential narrow groove on the inside surface thereof and longitudinal slots extending between said grooves, the sections outlined by said longitudinal slots having a circumferential narrow groove on the outside diameter thereof near alternately opposite ends, wherein said circumferential narrow grooves provide substantially localized yield lines and wherein the sum of the widths of said plurality of circumferential narrow grooves constitutes a minor portion of the end-to-end distance of said cylindrical distortable member whereby the major contribution to damping is provided by substantially straight portions of said cylindrical distortable member intermediate said narrow grooves, a second cylindrical distortable member positioned within the inside diameter of said first distortable member and having spring means therein for urging said second distortable member in an outward direction and against said first distortable member, said second distortable member being composed of trapezoidal sections which are alternately wider at one end than at the other end, a rotatable member within said second distortable member and supported by said housing, said first distortable member being distorted radially in response to temperature change, said distortable member being distorted in an inward direction with increase in temperature, thereby varying the volume inclosed by said second distortable member and causing the gap distance between the inside diameter of said second distortable member and the outside diameter of said rotatable member to change accordingly.

References Cited in the file of this patent

UNITED STATES PATENTS

| | | |
|---|---|---|
| 2,420,360 | Deming | May 13, 1947 |
| 2,718,149 | Bamford et al. | Sept. 20, 1955 |
| 2,955,471 | Swartz et al. | Oct. 11, 1960 |

FOREIGN PATENTS

| | | |
|---|---|---|
| 484,667 | Canada | July 8, 1952 |